Sept. 17, 1946.  J. DELISO  2,407,921
ROTARY BROACH
Filed Feb. 19, 1944
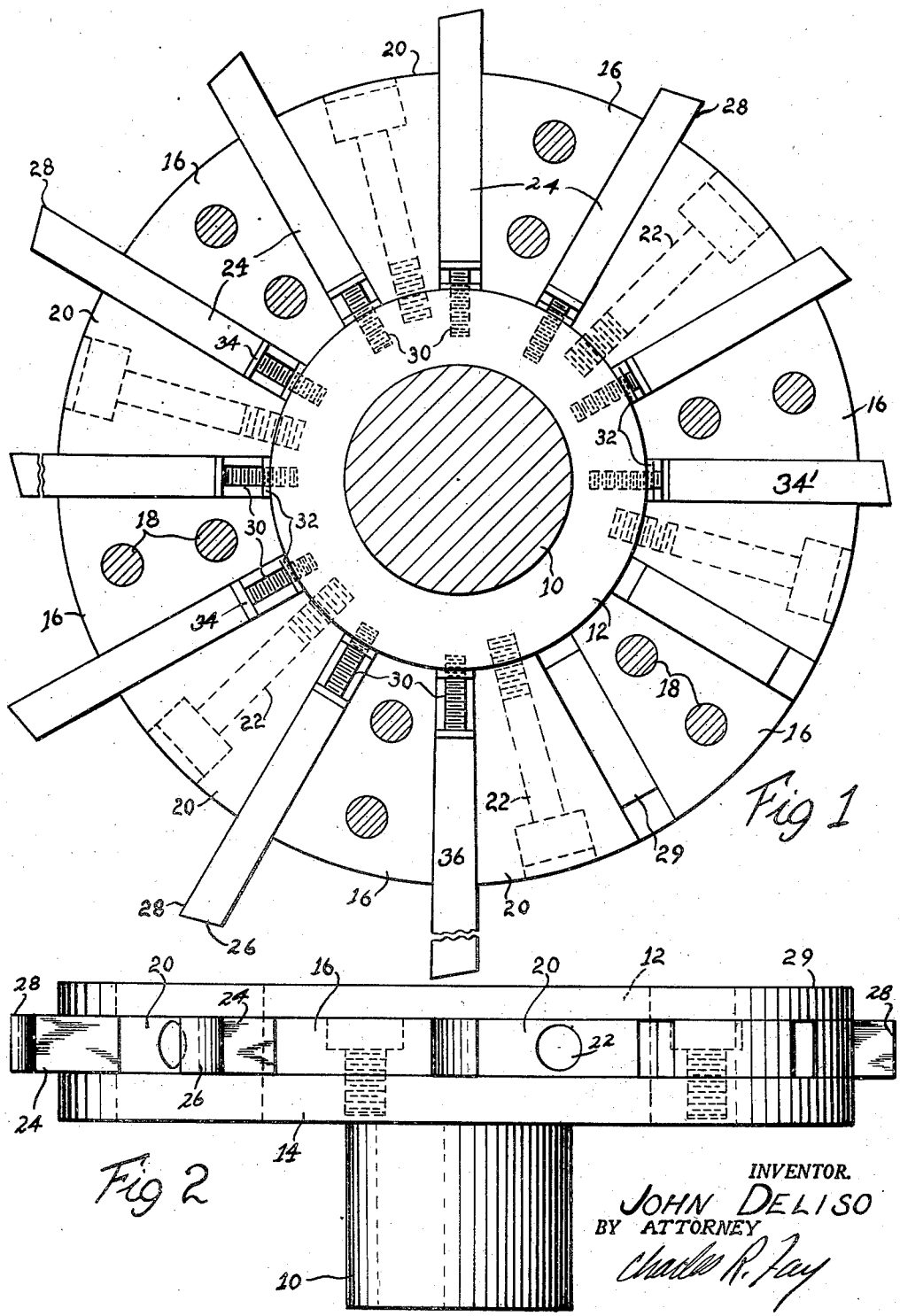

Patented Sept. 17, 1946

2,407,921

UNITED STATES PATENT OFFICE 2,407,921

ROTARY BROACH

John Deliso, Worcester, Mass.

Application February 19, 1944, Serial No. 523,010

4 Claims. (Cl. 29—95.1)

This invention relates to a rotary broach and the objects of the invention include the provision of a rotary broach particularly adapted to progressively broach out excess material between the tangs of a wrench, or similar broaching work. However, the invention is not limited to the type of work to be done but depends for its scope on the appended claims.

Further objects of the invention reside in the provision of an insertable tool or tooth broach wherein the latter comprises a generally circular plate or body provided with fixed radially arranged triangular or pie-shaped elements arranged in spaced relation on a face thereof, there being a radially movable clamping member similar in shape to said elements between each element, said clamping members securing removable tools to the said elements; and the provision of a broach as aforesaid wherein adjacent side edges of the clamping elements and movable members are parallel and thereby accommodate tool bits having straight parallel sides.

Another object of the invention resides in the provision of a circular plate having peripheral teeth extending generally radially beyond the periphery of the plate in a series wherein the initial cutting tooth is extended to a minimum degree and the following teeth project to progressively greater degrees to the last tooth, there then being a gap between the last and first teeth to provide for removal of the finished work piece and insertion of the next blank to be broached.

Other objects and advantages of the invention will appear hereinafter.

Reference is to be had to the accompanying drawing in which:

Fig. 1 is a view in elevation with parts removed to show the details of the broach; and Fig. 2 is an edge view of a complete broach according to the invention.

The present broach is adapted to be rotated by a center shaft 10 to which it is secured by any desired or convenient means. A hub 12 forms a part of a circular plate body or wheel 14, or may be separate therefrom but secured thereto as by bolts or other means.

A series of spaced triangular elements 16 are secured in mutually spaced relation to a face of the circular plate or wheel 14 as by bolts 18, or the elements 16 may be integral with the circular plate if desired. In any case, elements 16 are radially arranged in fixed position and have their wider outer ends corresponding to the periphery of the circular plate and their narrower inner ends closely approaching or abutting the hub 12.

Between every pair of elements 16 there is disposed a member 20 of similar shape, the members 20 alternating about the shaft with elements 16 as shown. Each member 20 is radially movable on the circular plate 14 and is provided with a bolt 22 actuable from the wider end of the member and threaded into hub 12 radially thereof. By this means the spaces between the elements 16 and members 20 is transversely varied to provide circumferential clamps for the tool bits to be described. It is to be particularly noted that each movable clamping member 20 will clamp two separate tools, one at each side thereof to the two next adjacent elements 16.

The tool bits or teeth 24 are straight sided and may be made from straight bar stock. Each bit may be of the same length, or they may be of different lengths, but all bits are ground as at 26 to provide a relieved cutting edge 28, the opposite ends of the bits being square. A cover plate 29 may be used to complete the wheel.

An adjusting device is provided to radially locate each tool bit in the desired position radially of the circular plate. Such device may assume many different aspects and may be of any desired or convenient construction, but as here shown each adjusting means comprises a screw threaded rod 30 threaded into hub 12 between each element 16 and member 20. A lock nut 32 is provided to hold the adjustment, and a head 34 may be utilized to seat the square ends of the tool bits. By this or other means for the same purpose the tool bits 26 are individually adjustable so that varying degrees of depth of cut for each tool may be achieved depending on the type of metal to be worked. In any case the initial cutter 34' extends outwardly of the wheel to a desired predetermined degree and each following tool is set a little further out until the last tool 36 of the series is reached. One rotation of the wheel finishes the broaching cut, and a gap between the last tool 36 and first tool 34' is provided so that the work may be removed and a new blank inserted prior to the next revolution of the tool bits. In other words the broach completes its work on a single pass, and does not depend on any movement of the work relative to the axis of the wheel. Hence a work piece may be positioned by the operator and left until the wheel makes its revolution, and then merely removed and replaced by the next blank during the rotative interval between the last tool 36 and first tool 34'.

It is pointed out that the number of tool bits and clamping elements is immaterial to the invention, and in most applications a greater number of tool bits will be used than here shown.

Also, the tools can extend from the wheels at any angle to the faces thereof, i. e., laterally parallel to the wheel axis, or at an angle to the axis, and I do not limit myself to circumferentially located tools.

Having thus described my invention and the advantages thereof, I do not wish to be limited to the details herein disclosed, otherwise than as set forth in the claims, but what I claim is:

1. A rotary broach comprising a circular plate, spaced generally triangular elements secured in radial relation to a face of the plate, clamping members interposed between the elements, cutting tools clamped between the members and elements, and means to adjust the tools radially of the plate.

2. A rotary broach comprising a flat circular plate, a series of spaced generally triangular elements secured to a face of the plate, generally triangular clamping members movable outwardly on the plate between the elements, said members and elements having parallel adjacent sides, straight sided cutting tools clamped between the members and elements, and means for adjusting each tool for greater or lesser depth of cut.

3. A rotary broach as recited in claim 2 wherein the tools progressively extend farther radially outwardly of the plate.

4. A rotary broach as recited in claim 2 wherein the tools extend outwardly laterally from the wheel.

JOHN DELISO.